United States Patent [19]

Danner

[11] Patent Number: 5,503,755
[45] Date of Patent: Apr. 2, 1996

[54] AQUEOUS WAX AND SILICONE DISPERSIONS, THEIR PRODUCTION AND USE

[75] Inventor: Bernard Danner, Riedisheim, France

[73] Assignee: Clariant Finance (BVI)Limited, Virgin Islands (Br.)

[21] Appl. No.: 320,470

[22] Filed: Oct. 7, 1994

Related U.S. Application Data

[63] Continuation of Ser. No. 126,947, Sep. 24, 1993, abandoned.

[30] Foreign Application Priority Data

Sep. 26, 1992 [DE] Germany ............... 42 32 345.2

[51] Int. Cl.$^6$ ............. D06M 15/643; C08J 3/05
[52] U.S. Cl. ............. 252/8.6; 252/8.8; 106/2; 106/271; 106/287.11; 106/287.14; 106/287.16; 8/115.6
[58] Field of Search ............. 106/2, 271, 287.11, 106/287.14, 287.16; 252/8.8, 8.6; 8/115.6

[56] References Cited

U.S. PATENT DOCUMENTS

| | | | |
|---|---|---|---|
| 3,847,622 | 11/1974 | Brandl et al. | 106/271 |
| 4,329,390 | 5/1982 | Danner | 106/271 |
| 4,404,035 | 9/1983 | Ona et al. | 106/271 |
| 4,434,008 | 2/1984 | Dumm et al. | 106/271 |
| 4,578,116 | 3/1986 | Rott et al. | 106/287.16 |
| 4,619,703 | 10/1986 | Gerber et al. | 106/271 |
| 4,666,772 | 5/1987 | Schinkel et al. | 428/330 |
| 4,692,386 | 9/1987 | Schinkel et al. | 428/515 |
| 4,743,660 | 5/1988 | Danner et al. | 525/382 |
| 4,767,646 | 8/1988 | Cordova et al. | 427/387 |
| 4,885,325 | 12/1989 | Danner et al. | 524/236 |
| 4,960,431 | 10/1990 | Cordova et al. | 8/115.6 |
| 4,978,561 | 12/1990 | Cray et al. | 427/387 |
| 5,000,861 | 3/1991 | Yang | 252/8.6 |
| 5,066,712 | 11/1991 | Lewis | 524/563 |
| 5,073,593 | 12/1991 | Ozaki et al. | 524/767 |
| 5,075,403 | 12/1991 | Kirk | 528/15 |
| 5,078,747 | 1/1992 | Kastele et al. | 8/115.6 |
| 5,145,596 | 9/1992 | Blank et al. | 252/106 |
| 5,302,657 | 4/1994 | Huhn et al. | 524/588 |

FOREIGN PATENT DOCUMENTS

| | | |
|---|---|---|
| 0220400 | 5/1987 | European Pat. Off. . |
| 0285391 | 10/1988 | European Pat. Off. . |
| 0342834 | 11/1989 | European Pat. Off. . |
| 0404027 | 12/1990 | European Pat. Off. . |
| 0415254 | 3/1991 | European Pat. Off. . |
| 0415540 | 3/1991 | European Pat. Off. . |
| 0459821 | 12/1991 | European Pat. Off. . |
| 0484000 | 5/1992 | European Pat. Off. . |
| 0484001 | 5/1992 | European Pat. Off. . |
| 0515044 | 11/1992 | European Pat. Off. . |
| 0523910 | 1/1993 | European Pat. Off. . |

OTHER PUBLICATIONS

Chemical Abstract of EP 0535437 No date.
Derwent Abstract of J63265955–A No date.

*Primary Examiner*—C. M. Bonner
*Attorney, Agent, or Firm*—Robert S. Honor; Carl W. Battle; Michael P. Morris

[57] ABSTRACT

Aqueous, dispersant-containing wax- and polysiloxane-dispersions (P) containing
as wax
 (A) at least one cationically modified hydrocarbon wax and optionally
 (B) at least one non-oxidized hydrocarbon wax,
as polydiorganosiloxane
 (C) at least one optionally amino-modified or/and non-ionically modified polydiorganosiloxane
and as dispersant
 (D) a non-ionogenic, cationic or amphoteric dispersant system,
are suitable as finishing agents, in particular as highly permanent softeners and sewability improving agents, especially for coloured goods.

10 Claims, No Drawings

AQUEOUS WAX AND SILICONE DISPERSIONS, THEIR PRODUCTION AND USE

This is a continuation of application Ser. No. 08/126,947, filed Sep. 24, 1993, now abandoned.

In the finishing of textile material for imparting an improved soft handle it is desired to meet the ever growing requirements set to the softening finishes, be it for wearing comfort of clothes, be it for the ready-making and any further handling of the goods, which is in particular of importance for permanent softening finishes. For permanent softening finishes there are mostly employed silicone-based softeners with which there may be obtained softening finishes of high permanence, but although there may be achieved a more or less efficient softening finish, this displays often— especially in ready-making of the goods— the less desired character of a "flowing" soft handle or also the not always desired typical "silicone-soft-handle". In the finishing with wax compositions there may be obtained in general semi-permanent finishes which mostly display a not particularly pronounced soft-handle.

It has now surprisingly been found that by combining certain softening silicones with certain modified waxes in the presence of certain surfactants, as defined below, there are obtainable softener compositions with which there may be achieved highly permanent finishings of outstanding very pleasant soft-handle, while the compositions are also compatible with further components that may be present in the treatment liquors and have a positive influence on the sewability of the goods.

The invention relates to the defined wax- and polydiorganosiloxane-comprising dispersions (P), their production and their use as finishing agents.

The invention thus provides an aqueous, dispersant-containing, wax- and polydiorganosiloxane-dispersion (P) containing
as wax
  (A) at least one cationically modified hydrocarbon wax and optionally
  (B) at least one non-oxidized hydrocarbon wax,
as polydiorganosiloxane
  (C) at least one optionally amino-modified or/and non-ionically modified polydiorganosiloxane
and as dispersant
  (D) a non-ionic, cationic or amphoteric dispersant system.

As waxes (A) come in general into consideration such waxes as are obtainable by cationical modification of carboxy-group-containing hydrocarbon waxes (A0), in particular by amidation of carboxy-group-containing oxidized and optionally partially saponified hydrocarbon waxes with a monoprimary polyamine and optionally quaternization of at least one amino group of the introduced aminoamide radicals.

As carboxy-group-containing oxidized and optionally partially saponified hydrocarbon waxes (A0) come in general into consideration any synthetic and/or mineral waxes that in the oxidized form have still a wax structure, e.g. oxidized montan waxes, oxidized microwaxes or oxidized polyolefin waxes (principally polyethylene waxes), or further waxes that are synthesized optionally directly in oxidized form, e.g. Fischer-Tropsch waxes or even their oxidation waxes, and where the mentioned oxidized waxes, especially the oxidized polyolefin waxes and the Fischer-Tropsch waxes, may optionally be partially saponified. Among the mentioned waxes ($A_0$) are preferred the oxidized and optionally partially saponified microwaxes, Fischer-Tropsch waxes and in particular polyethylene waxes. Such waxes are in general known and may be characterized by conventional parameters as dripping point, acid number, needle penetration (e.g. by ASTM-D 1321) and optionally saponification number, density, molecular weight and/or solidification point. The dripping point of ($A_0$) is preferably above 80° C., in particular within the temperature range of 80° to 150° C.; the acid number of ($A_0$) is advantageously in the range of 5 to 80, preferably 10 to 60; the needle-penetration of ($A_0$) by ASTM-D 1321 is advantageously $\geq 20$ dmm, principally in the range of 0.1 to 20, preferably 0.5 to 10 dmm. The saponification number of ($A_0$) is advantageously in the range of 10 to 120, preferably 20 to 80. Among the oxidized microwaxes are preferred those whose dripping point is within the temperature range of from 90° to 120° C.; among the oxidized optionally partially saponified polyethylene waxes are preferred those whose dripping point is within the temperature range of 102° to 140° C.; among the Fischer-Tropsch waxes are preferred in particular the partially saponified Fischer-Tropsch waxes, the dripping point of which is in the temperature range of 85° to 120° C. Among the mentioned waxes ($A_0$) are preferred the oxidized optionally partially saponified polyethylene waxes. The density of the mentioned waxes ($A_0$) is advantageously in the range of 0.9 to 1.05 g/cm$^3$ at 20° C., and among the oxidized polyethylene waxes are particularly preferred those with a density in the range of 0.93 to 1.02 g/cm$^3$ at 20° C. Among the oxidized polyethylene waxes are particularly preferred the ones with an average molecular weight $\overline{M}w$ in the range of 1000 to 20000.

Cationically modified derivatives of such waxes ($A_0$) are described e.g. in DE 36 21 345 A1 (corresponding to U.S. Pat. Nos. 4,743,660 and 4,885,325), the content of which is incorporated herein by reference.

For the amidation of the carboxy-group-containing waxes are suitable in general any polyamines that contain only one primary amino group while the others are secondary or tertiary; advantageously there are employed aliphatic and/or aromatic diamines corresponding to the following formula

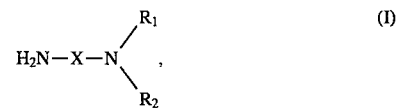

in which
X signifies a divalent hydrocarbon radical with 2 to 8 carbon atoms,
$R_1$ signifies hydrogen, $C_{1-24}$-alkyl, $C_{14-24}$-alkenyl or $C_{2-4}$-hydroxyalkyl
and
$R_2$ signifies hydrogen, $C_{1-4}$-alkyl, $C_{2-4}$-hydroxyalkyl or benzyl, with the proviso that at most one of $R_1$ and $R_2$ signifies hydrogen, or $R_1$ and $R_2$ together with the nitrogen atom to which they are bound form a morpholine ring.

The divalent hydrocarbon radical X may be aromatic or aliphatic, e.g. phenylene-1,4 or -1,3, hexamethylene, tetramethylene, isobutylene, propylene-1,3 or ethylene. Preferably X signifies propylene-1,3 or ethylene, especially propylene-1,3.

The symbol $R_1$ may signify an alkyl radical of a higher saturated fatty amine, e.g. behenyl, arachidyl, stearyl, palmityl, myristyl, lauryl or nonyl, or the alkenyl radical of an unsaturated fatty amine, as e.g. oleyl or palmitoleyl; as hydroxyalkyl radicals in the significance of $R_1$ and also $R_2$ come principally into consideration 2-hydroxypropyl and 2-hydroxyethyl. With particular preference the symbols $R_1$ and $R_2$ signify low molecular alkyl radicals with 1 to 4 carbon atoms, in particular ethyl or methyl.

In general there are employed preferably those amines of formula (I) which derive from the addition of acrylonitrile to an amine of formula $R_1R_2NH$ and subsequent reduction of the nitrile group to the aminomethyl group.

Preferred amines of formula (I) correspond to the formula

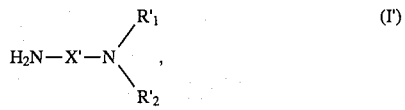

in which $R_1'$ and $R_2'$ signify each $C_{1-2}$-alkyl and $X'$ signifies ethylene or preferably propylene-1,3.

The amidation of the carboxy-group-containing waxes $(A_0)$ with the respective polyamines, in particular those of formula (I), takes place in general under conventional amidation conditions, expediently in the melt under dehydrating conditions, preferably in the temperature range from 130° to 190° C. The amidation is advantageously carried out to such a degree that the original acid number of $(A_0)$ is reduced by at least 50 %. Preferably the acid number of the amidated wax amounts to values that are $\leqq 20$ % of the original acid number of the carboxy-group-containing, oxidized and optionally partially saponified wax $(A_0)$.

The quaternization of the amidated waxes takes place in general under conventional quaternizing conditions, suitably in the melt, preferably at temperatures in the range of from 80° to 140° C. The radicals introduced by quaternization are principally conventional low molecular aliphatic optionally substituted radicals which are preferably free of anionic substituents, in particular benzyl, β-hydroxyethyl or $C_{1-4}$-alkyl. The quaternization is preferably carried out to such a degree that the present aminoamide groups are quaternized to a major proportion, with particular preference so that practically all quaternizable aminoamide groups are quaternized.

The quaternary radicals deriving from amines of formula (I) and which are bound to the backbone of the waxes (A) may be represented by the following formula (a)

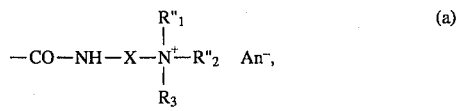

in which $R_3$ signifies $C_{1-4}$-alkyl, β-hydroxyethyl or benzyl, $An^-$ signifies a colourless counterion to the ammonium cation and $R_1''$ and $R_2''$ correspond each to the significances of $R_1$ and $R_2$ respectively, except where $R_1$ or $R_2$ is hydrogen, in which case the corresponding symbol $R_1''$ or $R_2''$ has one of the significances of $R_3$.

Preferably $R_3$ signifies ethyl or methyl, in particular methyl. $An^-$ signifies preferably a halide anion (bromide or preferably choride) or especially etho- or methosulphate.

The waxes (A) may be unitary, cationically modified waxes or also mixtures of such waxes, in particular mixtures of cationically modified polyethylene waxes with cationically modified oxidized microwaxes and/or Fischer-Tropsch waxes or mixtures of cationically modified oxidized microwaxes with cationically modified Fischer-Tropsch waxes.

As waxes (B) come essentially into consideration paraffin waxes, in particular those obtainable by the working-up of petroleum and/or of residues of the petroleum distillation, principally refined paraffins. Such waxes may also be characterized by conventional parameters e.g. by their needle-penetration and optionally by their solidification point and/or dripping point. The needle-penetration according to ASTM-D 1321 is advantageously $\leqq 40$ dmm, preferably in the range of from 0.5 to 30 dmm. The dripping point is advantageously $\geqq 40°$ C., preferably in the range of from 45° to 112° C.

The weight ratio (B)/(A) is in particular in the range of 0 to 3, principally 0.2 to 3, preferably 0.5 to 2.

As polydiorganosiloxanes (C) are suitable in general any polydiorganosiloxanes containing Si-linked, preferably aliphatic, optionally amino-substituted or/and non-ionogenically substituted hydrocarbon radicals and which are dispersible in water with the aid of suitable dispersants. Advantageously these hydrocarbon radicals bear either no modifying substituents or, if they bear any modifying substituents, the latter are either non-ionic substituents or preferably aliphatic amino groups which are linked to Si over the said hydrocarbon bridges. The available amino groups may optionally be substituted, in particular aliphatically (open chain or cyclic) substituted or amidated, preferably acylated with an aliphatic carboxylic acid. Essentially (C) are such polydiorganosiloxanes as are known as textile finishing agents, in particular as textile softeners, or as are usable analogously thereto. Preference is given to polydimethylsiloxanes which may be hydroxy-, ethoxy-, methoxy-, ethyl- or methyl-terminated and which preferably contain siloxy units which are amino-substituted over a lower aliphatic hydrocarbon radical. Preferably the polydiorganosiloxanes (C) to be employed are built-up of repeating units of the following formulae

and preferably

in which

Y signifies a divalent hydrocarbon radical with 2 to 6 carbon atoms, $R_4$ signifies hydrogen, $C_{1-4}$-alkyl or $-(CH_2)_m-NH_2$, m signifies 2 or 3, $R_5$ signifies $-CH_3$ or $-O-G_1$ and $G_1$ signifies hydrogen, methyl or the bond to a radical of the below indicated formulae $(c_3)$ or $(c_4)$ or a polysiloxane radical of units $(c_1)$ and/or $(c_2)$.

The terminal groups of the polysiloxane chains correspond preferably to the formulae

and/or

in which $G_2$ signifies methyl, ethyl, methoxy, ethoxy or hydroxy.

In the formulae (c$_2$) and (c$_4$) Y signifies advantageously an aliphatic, preferably saturated hydrocarbon chain with 3 to 4 carbon atoms, in particular propylene-1,3 or 2-methyl-propylene-1,3.

R$_4$ signifies preferably hydrogen, aminoethyl or aminopropyl, in particular aminoethyl.

R$_5$ preferably signifies methyl.

The polydiorganosiloxanes (C) may be unitary polysiloxanes or mixtures of different polysiloxanes. Their viscosity is advantageously in the range of 500 to 30,000, principally 700 to 20,000, preferably 1000 to 15,000 cP (Brookfield, rotational viscometer Rv, Spindle No. 5. 20° C.). The amine number of the (total) polydiorganosiloxanes (C) is advantageously in the range of 0 to 5.0; if the polydiorganosiloxanes (C) are amino-group-containing their amine number is preferably in the range of 0.001 to 5, more preferably 0.01 to 2, in particular 0.02 to 1. As amine number there is intended the number of moles of hydrochloric acid that is required to neutralize all amino groups in 1000 g of non-protonated substrate (C).

Schematically the optionally amino-modified preferred polydiorganosiloxanes (C) may be represented by the following general formula

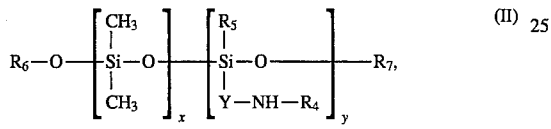  (II)

in which R$_6$ and R$_7$ signify each a group of the formula (c$_3$) or (c$_4$) and the indexes x and y are chosen so that the polymer displays the above indicated values for amine number and viscosity. The ratio of the number of dimethylsiloxy units to the number of aminosiloxy units in particular of the formula

  (c'$_2$)

is advantageously in the range of 3/1 to 5000/1, preferably 10/1 to 2000/1, in particular 30/1 to 700/1.

The amino-modified polydiorganosiloxanes (C) may be produced in a manner known per se or analogously to known methods, e.g. by aminoalkylation of corresponding polydiorganosiloxanes that contain Si-linked reactive hydrogen atoms or preferably by reaction of amino-group-containing silanes with non-ionic reactive mono- or poly-diorganosiloxanes, in particular with α,ω-dihydroxypolydimethylsiloxanes which advantageously have an average molecular weight $\overline{M}_N$ in the range of 500 to 10,000, preferably 1000 to 7000, or cyclic siloxanes e.g. hexamethylcyclotrisiloxane or/and octamethylcyclotetrasiloxane. As aminosilanes come principally into consideration aminosubstituted trimethoxysilanes or dimethoxymethylsilanes, in which the amino group is linked to the silicon atom over carbon and corresponds preferably to the formula —Y—NH—R$_4$. Preferred radicals —Y—NH—R$_4$ are γ-aminopropyl and γ-(β-aminoethylamino)-propyl.

If desired, the amino groups present in the amino-modified polysiloxane molecule may be alkylated e.g. with C$_{1-12}$-alkyl groups. These alkyl groups may be linear or, if they contain 3 to 12 carbon atoms, also branched or, if they contain ≧6 carbon atoms, also cyclic; among these are preferred the C$_{4-9}$-aliphatic radicals, in particular C$_{6-9}$-cycloaliphatic radicals. According to a further variant, the amino groups in the amino-group-containing polydiorganosiloxanes may be acylated e.g. with aliphatic carboxylic acid radicals containing 2 to 12 carbon atoms, preferably those containing 2 to 8 carbon atoms and which are either unsubstituted or, if they contain 4 to 8 carbon atoms, are preferably hydroxy-substituted.

The alkylation of amino groups in the polydiorganosiloxane may be partial or exhaustive; advantageously at least 20 mol-%, in particular 40 to 100 mol-% of the available alkylatable amino groups are alkylated. The production thereof may take place in known manner, e.g. as described in EP 306 935 A2, the content of which is incorporated herein by reference. For the introduction of acyl groups there may be employed for instance the corresponding acid anhydrides or, for hydroxy-substituted acyl groups, in particular the corresponding lactones (e.g. γ-butyrolactone, γ- or δ-valerolactone and γ-, δ- or ε-caprolactone). The available amino groups may be acylated partially or even exhaustively, there may e.g. be acylated 10 to 100, preferably 30 to 90 mol-% of the available amino groups.

The production of aminofunctional polydiorganosiloxanes may take place in a manner known per se, e.g. as described in U.S. Pat. Nos. 2,947,771 and 4,419,391, in French Patent 2 440 961 and in published European Patent Applications EP-A 55 606, 68 671 and 417 047. The acylation of aminofunctional polydiorganosiloxanes may also take place in a manner known per se, e.g. as described in U.S. Pat. Nos. 2,929,829, 3,440,261 and 4,507,455 or in EP 342 830 A2. The content of the mentioned patents and published patent applications is incorporated herein by reference.

There may be employed unitary polydiorganosiloxanes or also mixtures of different polydiorganosiloxanes, e.g. of simple polydimethylsiloxanes, that do not contain any further substituents besides the dimethylsiloxy units and the end groups G$_2$, and amino-functional polydimethylsiloxanes, in which the amino groups may optionally be modified as described above. For instance in amino-modified polydiorganosiloxanes with a very low amine number (e.g. in the range of 0.001 to 0.4) these may be mixtures of amino-modified and non-amino-modified products.

The weight ratio (C)/(A) in the dispersions (P) of the invention may range in a broad scope, suitably in an efficient range, advantageously in the range of 0.05 to 15, preferably 0.1 to 12, in particular 0.1 to 7. According to a particular feature of the invention the weight ratio (C)/(A) in the preferred dispersions (P') of the invention, is in the range of 1.5 to 12, in particular 2 to 7.

The compositions (P) according to the invention contain the waxes (A) and optionally (B) and the polydiorganosiloxanes (C) in dispersed form, for which there are employed dispersants (D).

The dispersant system (D) may consist of one or more surfactants in particular of (D$_O$) a non-ionogenic surfactant or a mixture of non-ionogenic surfactants, (D$_K$) a cationactive surfactant or a mixture of cationactive surfactants, and/or (D$_x$) an amphoteric surfactant or a mixture of amphoteric surfactants.

As non-ionogenic surfactants (D$_O$) there may be employed in general known compounds that contain at least one lipophilic radical and at least one non-ionogenic hydrophilic radical, and the HLB-values of which may be e.g. in the range of 2 to 16, and which may be of aliphatic and optionally also aromatic character; preferably the surfactants (D$_O$) are purely aliphatic. There may be mentioned for instance the following categories of surfacrants: oxyalkylation products of higher fatty acids or fatty acid amides, of higher fatty alcohols or mono- or di-alkylphenols, fatty acid partial esters of polyols (e.g. glycerine, sorbitan or sorbitol) and their oxyalkylation products; optionally the oxyalkylation products may contain a minor proportion of propyleneoxy units. Particularly worth mention are sorbitan monoesters of $C_{8-16}$- (preferably $C_{11-14}$-) -fatty acids and oxyethylation products of fatty alcohols or fatty acid amides in which the fatty radical contains advantageously 8 to 22, preferably 10 to 18, carbon atoms. There may in particular be mentioned oxyethylation products of the following fatty alcohols and fatty acid amides: laurylalcohol, myristylalcohol, cetylalcohol, oleylalcohol, stearylalcohol and technical alcohols, in particular optionally hydrated or distilled tallow fatty alcohol and coconut fatty alcohol, as well as the analogous fatty acid amides and little- or highly-branched primary or secondary synthetic alcohols, e.g. those from the oxosynthesis (e.g. from propylene), among which are preferred those with 10 to 15 carbon atoms, principally trimethylnonanol, tetramethylnonanol and tetramethyldecanol, in particular the primary isotridecyl alcohol tetramethylnonanol-1 and secondary saturated $C_{13-16}$-fatty alcohols. As cationactive surfactants ($D_K$) come in general into consideration, conventional cationactive surfactants that contain at least one lipophilic hydrocarbon radical and at least one hydrophilic cationic group; as hydrophilic cationic groups come in particular into consideration basic amino groups and their protonated and/or quaternated derivatives, principally tertiary amino groups and protonated or quaternary ammonium groups. The ammonium groups may optionally belong to a heterocycle e.g. to a pyridinium- or imidazolinium-ring. Optionally the nitrogen atoms may be substituted with hydroxyethyl or polyethyleneglycol chains. There may in particular be mentioned the cationic surfactants of the following formula

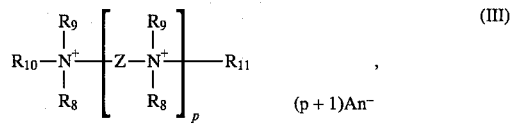

(III)

in which $R_8$ signify each independently $C_{1-4}$-alkyl or a radical of the formula $-(CH_2-CH_2-O)_q-H$, $R_9$ signify each independently hydrogen, $C_{1-4}$-alkyl, β-hydroxyethyl or benzyl, $R_{10}$ signifies a radical of the formula $R_{12}-CH_2-$, $R_{12}-CO-NH-Z'-$ or $R_{12}-CH_2-O-Z''-$, $R_{11}$ signifies $C_{1-4}$-alkyl, a radical of the formula $-(CH_2-CH_2-O)_p-H$ or $R_{10}$, $R_{12}$ signifies an aliphatic hydrocarbon radical with 7 to 23 carbon atoms, Z signifies $C_{2-6}$-alkylene, Z' signifies $C_{2-6}$-alkylene, Z" signifies $C_{2-6}$-alkylene or $-CH_2-CHOH-CH_2-$, p signifies a number from 0 to 2, preferably 0 to 1, q signifies independently at least 1, $\Sigma_q$ being $\leq 70$, and $An^-$ signifies a counterion to the ammonium cation.

If in formula (III) $R_9$ signifies hydrogen, there may advantageously be employed the corresponding protonatable free bases of the formula

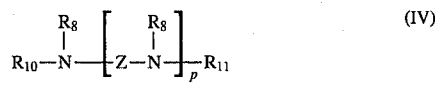

(IV)

which may then be protonated.

The radical $R_{12}$ contains advantageously 11 to 21 carbon atoms. As radicals $R_{12}-CH_2-$ come into consideration principally the following: lauryl, palmityl, cetyl, oleyl, stearyl, behenyl, arachidyl, tallowalkyl and cocoalkyl, among which are preferred those with 12 to 18 carbon atoms. As radicals $R_{12}-CO-$ come in particular into consideration the acyl radicals of the corresponding fatty acids, e.g. lauroyl, palmitoyl, myristoyl, oleoyl, stearoyl, behenoyl and arachidoyl, and the radicals of technical fatty acids, e.g. of tallow fatty acid and coconut fatty acid, among which are preferred those with 12 to 18 carbon atoms.

Z and Z' signify preferably $Z_1$, i.e. ethylene or propylene, among which propylene-1,3 is particularly preferred.

Z" signifies preferably ethylene, propylene or 2-hydroxypropylene-1,3.

$R_8$ signifies preferably methyl, ethyl or a radical of the formula $-(CH_2-CH_2-O)_{q1}-H$.

$R_9$ signifies preferably hydrogen or $R_9'$, i.e. $C_{1-4}$-alkyl or benzyl.

$R_{10}$ signifies preferably $R_{10}'$, i.e. $R_{12}-CH_2-$ or $R_{12}-CO-NH-Z'-$.

$R_{11}$ signifies preferably $C_{1-4}$-alkyl or a radical of the formula $-(CH_2-CH_2-O)_{q1}-H$.

p signifies preferably 0 or 1.

q signifies at least 1, $\Sigma q1$ being $\leq 40$, preferably $\leq 20$.

In a preferred sub-group of cationic surfactants ($D_K$) of formula (III)

$R_8$ signifies $R_8'$, i.e. methyl or ethyl, $R_9$ signifies $R_9'$, preferably methyl or ethyl, $R_{10}$ signifies $R_{10}'$, $R_{11}$ signifies $R_{11}'$, i.e. $C_{1-4}$-alkyl, preferably methyl or ethyl, and the index p signifies p', i.e. 0 or 1, preferably 0;

$An^-$ signifies in this a conventional anion, in particular as is formed in quaternization.

In a further preferred sub-group of the cationic surfactants ($D_K$) of formula (III)

$R_8$ signifies $R_8"$, i.e. a radical of formula $-(CH_2-CH_2-O)_{Q1}-H$, $R_9$ signifies hydrogen, $R_{10}$ signifies $R_{10}'$, $R_{11}$ signifies $R_{11}"$, i.e. a radical of formula $-(CH_2-CH_2-O)_{q1}-H$, p signifies p", i.e. 0 or 1, and q signifies q1, i.e. at least 1, $\Sigma q1$ being=2 to 40, preferably 2 to 20;

$An^-$ signifies in this a counter-ion as is formed in protonation.

Preferred amines of formula (IV) correspond to formula

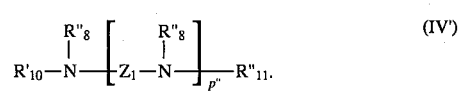

(IV')

The quaternary surfactants ($D_K$) correspond advantageously to the formula

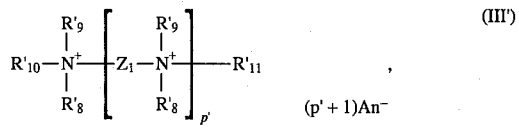

(III')

preferably to the formula

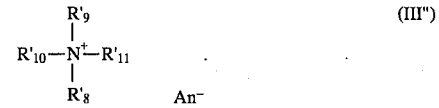

(III")

As amphoteric surfactants ($D_x$) come into consideration in general any amphoteric surfactants, e.g. as are described in B. R. BLUESTEIN and Clifford L. HILTON "Amphoteric Surfactants" (Volume 12 of "Surfactants Science Series" Marcel DEKKER Inc., New York and Basel, 1982) especially in Chapters 1 to 4. Essentially come into consideration those surfactants that, besides a lipophilic hydrocarbon radical and an anionic group (respectively acid group), contain in the molecule at least one tertiary optionally protonated amino group or quaternary ammonium group. Advantageously as $(D_x)$ there are employed those amphoteric surfactants in which the anionic group (indicated as free acid group) is a carboxylic or sulphonic acid group and the lipophilic hydrocarbon radical is an aliphatic fatty radical which is linked over a carbamoyl group to the remaining portion of the molecule or is the 2-positioned substituent of an amphoteric imidazoline or of the imidazolinium ring of a betaine of the imidazolinium series. Preferably as amphoteric surfactants $(D_x)$ there are employed compounds corresponding to formulae (II), (III), (IV) or/and (V) [respectively (Vbis)] of EP 417 047 A2. Among the mentioned amphoteric surfactants are particularly preferred those of the following formula

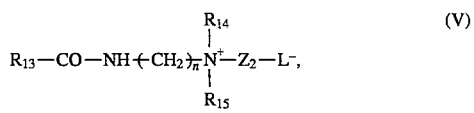

(V)

in which $R_{13}$—CO— signifies the the acyl radical of a fatty acid with 8 to 24 carbon atoms, $R_{14}$ signifies hydrogen, $C_{1-4}$-alkyl, $C_{2-4}$-hydroxyalkyl or benzyl, $R_{15}$ signifies $C_{1-4}$-alkyl or $C_{2-4}$-hydroxyalkyl, $Z_2$ signifies $C_{1-3}$-alkylene or 2-hydroxypropylene-1,3, $L^-$ signifies —COO$^-$ or —SO$_3^-$, and n signifies 2 to 6.

$R_{13}$—CO— stands advantageously for the acyl radical of an aliphatic fatty acid with 12 to 20, preferably 14 to 18 carbon atoms, in particular as listed above.

$R_{14}$ stands preferably for hydrogen, methyl, ethyl, β-hydroxypropyl or β-hydroxyethyl, among which hydrogen and methyl are particularly preferred.

$R_{15}$ stands preferably for methyl, ethyl, β-hydroxyethyl or β-hydroxypropyl, among which methyl and especially β-hydroxyethyl are preferred.

—$Z_2$—$L^-$ stands preferably for the carboxymethyl group or with particular preference for the 2-hydroxy-3-sulphopropyl-1-group.

If in the above formula (V) $R_{14}$ signifies hydrogen, this formula represents the inner salt form; depending on the pH, in particular under alkaline pH-values, the respective compound is also in the form of the corresponding external salt.

The kind and quantity of surfactants (D) is suitably chosen so that a corresponding aqueous dispersion of the waxes and polydiorganosiloxanes can be formed.

The dispersions (P) of the invention may be produced by admixing with each other the respective components for the formation of a corresponding dispersion. Advantageously an aqueous wax dispersion (W), that contains the waxes (A) and—if present—(B), is mixed with an aqueous dispersion (S) of the polydiorganosiloxanes (C), where at least a part of the dispersants (D) is contained in these dispersions and any residual and further dispersant (D) or/and further water and optionally further additions [e.g. (E), (F) or/and (G) defined below] may be admixed therewith simultaneously or subsequently. With particular preference there is produced an aqueous dispersion (W') of the waxes (A) and (B), that contains as dispersant (D') at least one cationactive surfactant ($D_K$) and/or at least one non-ionic surfactant ($D_O$), and this is admixed with an aqueous dispersion (S') of (C), that contains as dispersing agent (D") at least one non-ionic surfactant ($D_O$) and at least one cationactive surfactant ($D_K$) and/or at least one amphoteric surfactant ($D_x$), and optionally with further surfactant (D) and/or water.

(D') is advantageously a dispersant system with cationic character, i.e. it consists of ($D_K$) optionally in admixture with ($D_O$); if it is a mixture of ($D_K$) and ($D_O$) it is of advantage that ($D_K$) outweighs ($D_O$); with particular preference (D') consists of ($D_K$). The weight ratio of (D') to the wax [(A) and, if present, (B)] is expediently chosen such that an aqueous dispersion can be formed, and is in particular in the range of 5 to 80, advantageously 10 to 60, preferably 12 to 40 parts by weight of (D') for every hundred parts by weight of total wax.

Advantageously there are produced aqueous concentrated wax dispersions (W) respectively (W') of fine particle size and with a dry substance content preferably in the range of 10 to 60, especially 15 to 50% by weight.

With particular preference there are employed as (W) respectively (W') wax dispersions as are described in DE 36 21 345 A1 and especially as preferred therein. The production of the wax dispersions may be carried out in a manner known per se, in particular by admixing of the waxes and surfactants in the melt and then diluting with water, and where quaternary components may also be produced by quaternizing the respective non-quaternated products in admixture with each other, e.g. the mixtures of quaternary wax (A) and quaternated surfactant ($D_K$). The production of the wax dispersions (W) in particular (W') is carried out advantageously as described in DE 36 21 345 A1 and especially as preferred therein.

For the production of a dispersion (S), especially (S'), the polydiorganosiloxanes (C) may be dispersed in water advantageously with a dispersant system (D") in a manner known per se, preferably so that a very fine dispersion or even a microdispersion is formed. As a fine dispersion there is in particular meant such a dispersion whose dispersed particles have preponderantly a particle size ≦5 μm, in particular so that practically all dispersed particles have a particle size ≦5 μm; as microdispersion there is meant such a dispersion in which the dispersed particles have preponderantly a particle size ≦1 μm, especially so that practically all dispersed particles have a particle size ≦1 μm, preferably ≦0.8 μm. Occasionally the light transmission of the composition may be used as a means for assessing the fineness of the particles of the dispersion. The scopes of the particle sizes may be assessed e.g. by measurement of the light-scattering (e.g. laser-light-scattering).

The silicone dispersions (S) respectively (S') may be produced in a manner known per se, expediently by suitable admixing of the respective surfacrants, in particular ($D_O$) and optionally ($D_K$) or/and ($D_x$), with the respective silicones (C) and the required amount of water. With aminofunctional silicones (C) it is of particular advantage to set the pH of the dispersions to acidic values, i.e. < pH 7, preferably in the pH-range of 3 to 6.5. The non-ionogenic surfactants ($D_O$) are advantageously of an HLB value in the range of 4 to 16; it being particularly preferred to employ a mixture of at least two non-ionic surfactants ($D_O$), viz. of non-ionic surfactants ($D_O$) of silicone-friendly character, i.e. in particular more lipophilic surfactants ($D_O$), preferably with an HLB in the range of 4 to 12, and more hydrophilic surfactants ($D_O$), i.e. in particular surfactants ($D_O$) with an HLB that is preferably in the range of 12 to 16, the HLB-value of the more hydrophilic surfactant ($D_O$) being higher than the one of the more lipophilic surfactant ($D_O$) advantageously by at least 0.5 units, in particular by 1 to 4 units. The weight ratio of the more hydrophilic non-ionic surfactant ($D_O$) to the more lipophilic non-ionic surfactant ($D_O$) in (D") is advantageously in the range of 0.5:1 to 8:1, principally 0.75:1 to 5:1, preferably 1.3:1 to 3:1. If there is employed ($D_x$) the weight ratio ($D_x$)/(C) is advantageously in the range of 0.05 to 0.7, preferably 0.1 to 0.5. The weight ratio (D0)/(C) is advantageously in the range of 0.05 to 0.6, preferably 0.07 to 0.5. Advantageously in (S) respectively in (S') there are employed 0 to 0.6, preferably 0 to.0.3 parts by weight of ($D_K$) for every part by weight (C).

The aqueous silicone dispersions (S), in particular (S'), contain advantageously 0.05 to 1.1, preferably 0.1 to 0.9 parts by weight of (D''') for every part by weight of (C). The dry substance content of these dispersions (S) respectively (S') is advantageously in the range of 15 to 70% by weight, preferably 20 to 60% by weight, in particular 25 to 50% by weight; the pH is advantageously in the range of 3 to 9, preferably 4 to 8.

By suitable choice of the silicones (C) and surfactants (D"), sequence of the additions, choice of the respective temperatures and pH-values and kind and working conditions of the mixing equipment, there may be produced very fine dispersions, in particular also microdispersions. The production of silicone dispersions is in general known in the art and is also described in the specialized literature, e.g. in the laid-open European Patent Applications EP 138 192 A1, 186 847 A1, 378 828 A2 and 417 047 A2, in U.S. Pat. Nos. 4 380 503 and 4 816 506, in published British Patent Applications GB-A 1 191 289, 1 598 845 and 2 215 729, in published French Patent Application FR-A 2 333 562, in East German Patent 133 196 and in "TORAY Technical Information M-OII about TORAY Silicone SF 8417 Fluid". The content of all U.S. Patents is incorporated herein by reference.

The wax/surfactant mixtures are advantageously dispersed in water at such temperatures that correspond at least in part to the melting range of the waxes, whereupon they may be cooled.

The polydiorganosiloxanes (C) may be dispersed by various methods, e.g. as described in the above indicated reference literature.

The two dispersions (W) and (S), especially (W') and (S'), may be admixed with each other with plain stirring, e.g. at temperatures in the range from 10° C. to temperatures in the melting range of the waxes, or e.g. the still hot wax dispersion (W) (e.g. of 80° to 95° C.) may be stirred into the cold silicone dispersion (S) (e.g. of 10° to 30° C.), or vice-versa the cold silicone dispersion (S) may be stirred into the still hot wax dispersion (W) the heating being switched off. If desired, further dispersant (D) and/or water may be added. If further dispersant (D) is added separately, this is advantageously (D''') at least one cationic dispersant ($D_K$) or/and at least one amphoteric dispersant ($D_x$), optionally in admixture with at least one non-ionic dispersant ($D_O$).

Preferably (D''') consists of at least one cationic dispersant ($D_K$) optionally in admixture with dispersant ($D_x$). With particular preference (D''') consists exclusively of ($D_K$).

According to a particular further feature of the invention, there are produced such dispersions (P), i.e. (P"), in which the weight ratio (C)/(A) is in the range of 0.05 to 1.5, preferably 0.1 to 1.0, and where the weight ratio ($D_K$)/[(A)+(B)+(C)] is advantageously in the range of from 0.1 to 1.2, preferably 0.2 to 0.8. In this the weight ratio (A)/(B) is as described above and especially as preferred above; also the weight ratios of ($D_O$) and ($D_x$) to (C) are in this as described above and especially as preferred above.

The total of the surfactants (D) [preferably in the form of (D') and (D") and optionally additional dispersant (D), preferably as (D''')] are advantageously chosen such that in the produced dispersion (P) [preferably also in (P')] the weight ratio of the total of the surfactants (D) to [(A)+(B)+(C)] is in the range from 0.1:1 to 1.3:1, in particular 0.1:1 to 0.8:1. In (P") the weight ratio of the total of the surfactants (D) to [(A)+(B)+(C)] is preferably in the range of 0.2:1 to 1.2:1, in particular 0.3:1 to 1.0:1.

The dry substance content of the aqueous dispersions (P) of the invention is advantageously in the range of 15 to 75, preferably 20 to 60% by weight referred to the total weight of (P).

The pH of the dispersions (P) is advantageously in the weakly basic to distinctly acidic range, advantageously in the pH range from 3 to 9, preferably in the nearly neutral to weakly acidic range, in particular in the pH range of 5 to 7.

The dispersions (P) of the invention may contain, besides the mentioned components (A), (B), (C) and (D), optionally minor proportions of further additions, in particular (E) acids and/or bases for pH-adjustment;

(F) organic solvents and/or hydrotropes, in particular from the production of polysiloxanes respectively (C)-dispersions; and/or (G) preserving agents or/and scents.

Components (E) are in general conventional bases or acids, in particular as described in EP 417 047 A2.

Components (F) are mainly those described in EP 417 047 A2 and are advantageously employed in the there indicated quantitative ratios.

As preserving agents (G) come into consideration before all biocides (fungicides, bactericides) and/or anti-freeze agents [e.g. mono- or di-($C_{2-4}$-alkylene)-glycols, glycerine or butane-1,3-diol].

Preferably the dispersions (P) of the invention contain, besides the above mentioned components (A), (C), (D) and water and optionally (B), (E), (F) or/and (G), no further additions. With particular preference the dispersions (P) of the invention consist essentially of (A), (C), (D), water and optionally one or more of the components (B), (E), (F) and (G).

The dispersions (P) of the invention are of very fine particle size and are distinguished by their storage stability.

The dispersions (P) of the invention serve as finishing agents for fibrous material and may, so as they have been composed, be directly employed for the formulation of application-liquors or may, if required, prior to the application from aqueous medium, be diluted with water to more diluted stock dispersions—as occasion demands. They are suitable for the finishing of fibrous material, principally textile material, from aqueous medium, especially in order to improve handle and slippage properties, in particular as softeners.

Any textile material as occurring in textile industry is suitable, viz. natural as well as synthetic or semi-synthetic materials and mixtures thereof, in particular natural or regenerated or modified cellulose, natural or synthetic polyamide, polyester, polyurethane or polyacrylonitril containing materials and mixtures thereof (e.g. PES/CO and PAN/CO). The material may be in any processing form e.g. as loose fibers, filaments, threads, yarn strands and bobbins, woven or knitted goods, non-woven webs, non-woven bonded webs, felts, carpets, velvet, tuftings or even half-ready-made or ready-made goods. Preferably cross-wound bobbins, flat or tubular textile fabrics (in particular knitted tubular goods) or piece goods are finished according to the invention. Most preferably coloured textile goods, especially cellulosic coloured goods, are finished according to the invention.

The finishing is carried out expediently from aqueous distinctly acidic to weakly basic medium, in particular in the pH-range of 3.0 to 8.5. The concentration of the compositions of the invention referred to the substrate may vary broadly, depending on the kind and the constitution of the substrate and the desired effect and—calculated as sum of the components [(A)+(B)+(C)]—it amounts advantageously to values in the range of 0.01 to 2, preferably 0.1 to 1.5% by weight of [(A)+(B)+(C)] referred to the dry weight of the substrate.

The finishing of the invention is advantageously carried out as the last finishing stage of the material, preferably following a bleaching and/or a dyeing process, optionally together with a further treatment e.g. a synthetic resin finishing of the fibrous material. The finishing may be carried out by any methods conventional per se, e.g. by impregnation or exhaustion processes. In exhaustion processes may come into consideration processes from long liquor as well as from short liquor, e.g. at liquor-to-goods ratios in the range of from 100:1 to 4:1, in particular between 60:1 and 5:1; the application temperature may also be in conventional scopes, in particular in the scope between ambient temperature and 60° C., preferably in the scope from 25° C. to 40° C.; the pH-value is preferably in the range of 4 to 8. The impregnation may also be carried out by methods conventional per se, e.g. by dipping, padding or foam application, preferably at temperatures in the range of from 15° to 40° C. and pH values in the range of from 4 to 8. After the impregnation procedure respectively after the exhaustion procedure the treated goods may be dried in conventional way, in particular at 30° to 180° C., preferably 60° to 140° C. Synthetic resin finishes may be fixed at conventional temperatures, in particular at 130° to 190° C., preferably 140° to 180° C.

The dispersions (P") are particularly suited for the application by exhaustion methods, especially in those systems and apparatuses in which the liquor and/or the substrate are subjected to a high dynamic stress, such as in jet dyeing machines, cross-wound bobbins, in winch becks or (only with regard to the liquor) also by spraying techniques, in the latter case optionally together with a synthetic resin finishing as mentioned above.

The dispersions (P') are particularly suited for the application by the impregnation methods, as mentioned above, and may also be employed in those exhaustion processes in which the liquor or the goods are not subjected to a strong (liquor shearing) dynamic stress as in jet dyeing machines or in the finishing of cross wound bobbins by forcing the liquor through the bobbin.

By the finishing of the invention with (P) there may be achieved besides an outstanding very pleasant and not undesirably "flowing" soft handle of high permanence on the textile material also an improvement of the mechanical workability, in particular of the mechanical dry workability especially of the sewability.

In the following examples the parts and percentages are by weight; the temperatures are indicated in degrees Celsius; parts by weight relate to parts by volume as grams to milliliters. C.I. stands for Colour Index.

The following waxes, polydiorganosiloxanes, surfactants, wax dispersions and polydiorganosiloxane dispersions are employed:

Oxidized waxes ($A_O$)

($A_0$) Oxidized polyethylene (PED 522 of HOECHST AG, Germany) with the following specifications:

| | |
|---|---|
| density | 0.96 |
| dripping point | 103° C. |
| solidification point | 83–88° C. |
| needle penetration ASTM-D 1321 | 4–6 dmm |
| acid number | 25 |
| saponification number | 50. |

Cationically modified waxes (A)

($A_1$) Reaction product of 224 parts of ($A_{01}$) with 11.2 parts of 3-(dimethylamino)-propylamine and 11.1 parts dimethylsulphate according to Example 1 of DE 36 21 345 A1.

Non-oxidized paraffin waxes (B)

| | | |
|---|---|---|
| ($B_1$) | dripping point | 58–60° C. |
| | needle penetration (ASTM-D 1321) | 20 dmm. |
| ($B_2$) | solidification point | 54–56° C. |
| | dripping point | 56° C. |
| | needle penetration (ASTM-D 1321) | 20 dmm. |
| ($B_3$) | solification point | 94–98° C. |
| | dripping point | 105–108° C. |
| | needle penetration (ASTM-D 1321) | 1–3 dmm. |

Polydiorganosiloxanes (C)

($C_1$) Unitary aminofunctional* polydimethylsiloxane with terminal trimethylsilyl groups; amine number=0.6; viscosity=1000 cP.

($C_2$) Non-unitary polysiloxane mixture of aminofunctional* and non-amino-functional polydimethylsiloxane with terminal reactive hydroxy groups; amine number=0.05; viscosity=2600 cP.

($C_3$) Unitary aminofunctional* polydimethylsiloxane with terminal reactive hydroxy groups; amine number=0.3; viscosity=5000 cP.

($C_4$) Unitary aminofunctional* polydimethylsiloxane with terminal trimethylsilyl groups; amine number=0.4; viscosity=10,000 cP.

($C_5$) Unitary aminofunctional* polydimethylsiloxane with terminal reactive hydroxy groups; amine number=0.13; viscosity=10,000 cP.

($C_6$) Unitary aminofunctional* polydimethylsiloxane with terminal trimethylsilyl groups, with an amine number (prior to acetylation)=0.3 and viscosity (prior to acetylation)=1000 cP, in which 50 mol % of the amino groups are acetylated.

* with Si-bound group

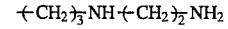

Dispersants ($D_O$)

($D_{01}$) Addition product of 6 mols of ethyleneoxide to 1 mol of technical isotridecylalcohol**.

($D_{02}$) Addition product of 8 mols of ethyleneoxide to 1 mol of technical isotridecylalcohol**.

($D_{03}$) Addition product of 6 mols of ethyleneoxide to 1 mol of 2,6,8-trimethylnonanol-4 (Tergitol TMN-6, Union Carbide).

($D_{04}$) Addition product of 4 mols of ethyleneoxide to 1 mol of technical isotridecylalcohol**.

($D_{05}$) Addition product of 9.5 mols of ethyleneoxide to 1 mol of technical isotridecylalcohol**.

($D_{06}$) Addition product of 5 mols of ethyleneoxide to 1 mol of laurylalcohol.

** technical isomeric mixture from the oxosynthesis

Dispersants ($D_K$)

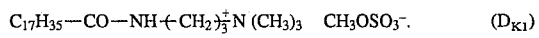

($D_{K2}$) Addition product of 15 mols of ethyleneoxide to 1 mol of tallow fatty amine.

Dispersants ($D_x$)

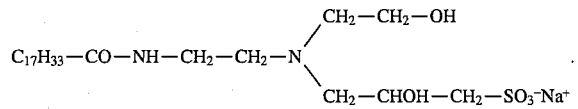

Silicone Dispersions (S)

The aminofunctional polysiloxanes are protonated with acetic acid and finally the pH is adjusted with hydrochloric acid.

($S_1$) Aqueous dispersion of
- 33 parts of silicone ($C_1$)
- 2 parts of surfactant ($D_{01}$)
- 4 parts of surfactant ($D_{02}$)
- water up to 100 parts of total dispersion ($S_1$).

pH 6.5. Average particle size between 0.6 and 1.5 μm.

($S_2$) Aqueous dispersion of
- 33 parts of silicone ($C_2$)
- 3.3 parts of surfactant ($D_{03}$)
- water up to 100 parts of total dispersion ($S_2$)

pH 6.5. Average particle size between 0.6 and 1.5 μm.

($S_3$) Aqueous microdispersion of
- 20 parts of silicone ($C_3$)
- 3 parts of surfactant ($D_{04}$)
- 5 parts of surfactant ($D_{05}$)
- 5 parts of surfactant ($D_{x1}$)
- 0.8 parts of surfactant ($D_{K1}$)
- 0.5 parts of surfactant ($D_{K2}$)
- 3 parts of 1,3-butanediol
- water up to 100 parts of total dispersion (S3)

pH 4.5. Average particle size <0.6 μm.

($S_4$) Aqueous microdispersion of
- 20 parts of silicone ($C_4$)
- 2.5 parts of surfactant ($D_{x1}$)
- 4 parts of surfactant ($D_{04}$)
- 8 parts of surfactant ($D_{05}$)
- water up to 100 parts of total dispersion ($S_4$)

pH 4.5, Average particle size <0.6 μm.

($S_5$) Aqueous dispersion of
- 33 parts of silicone ($C_5$)
- 4.2 parts of surfactant ($D_{06}$)
- 1.8 parts of surfactant ($D_5$)
- water up to 100 parts of total dispersion ($S_5$)

pH 6. Average particle size between 0.6 and 1.5 μm.

($S_6$) Aqueous microdispersion of
- 20 parts of silicone ($C_6$)
- 4 parts of surfactant ($D_{04}$)
- 8 parts of surfactant ($D_{05}$)
- 2.5 parts of surfactant ($D_{x1}$)
- water up to 100 parts of total dispersion ($S_6$)

pH 4.5, Average particle size <0.6 μm.

Wax dispersions (W)

($W_1$) Aqueous dispersion produced according to Example 8 of DE 36 21 345 A1 of:
- 10 parts of paraffin wax ($B_1$)
- 10 parts of cationically modified wax ($A_1$)
- 5 parts of dispersant ($D_{K1}$)
- and water up to 100 parts of total dispersion ($W_1$).

(W2) Aqueous dispersion produced according to Example 1 of DE 36 21 345 A1 of:

($D_{X1}$)

- 10 parts of paraffin wax ($B_2$)
- 10 parts of cationically modified wax ($A_1$)
- 5 parts of dispersant ($D_{K1}$)
- and water up to 100 parts of total dispersion ($W_2$).

($W_3$) Aqueous wax dispersion produced as follows:
160 parts of paraffin ($B_2$) are preset, melted and heated to 110° C. Then 160 parts of cationic wax ($A_1$) and 80 parts of dispersant ($D_{K1}$) are added thereto. As soon as a homogenous melt is formed it is quickly added into 600 parts of water at 95° C. A fine dispersion is formed which is stirred for further 30 minutes at 95° C. It is then cooled to room temperature.

(W4) Aqueous wax dispersion produced according to Example 4 of DE 36 21 345 A1 of:
- 10 parts of paraffin wax ($B_3$)
- 10 parts of cationically modified wax ($A_1$)
- 5 parts of dispersant ($D_{K1}$)
- and water up to 100 parts of total dispersion ($W_4$).

EXAMPLE 1

Dispersion ($P_1$)

55 parts of wax dispersion ($W_1$) and 45 parts of silicone dispersion ($S_1$) are mixed with each other with stirring at room temperature (=20° C.).

EXAMPLES 2 to 7

Dispersions ($P_2$) to ($P_7$)

Example 1 is repeated, with the difference that the following dispersions (W) and (S) are mixed with each other at room temperature with stirring:

Dispersion ($P_2$): 50 parts of dispersion ($W_1$)+50 parts of dispersion ($S_2$)

Dispersion ($P_3$): 30 parts of dispersion ($W_3$)+70 parts of dispersion ($S_3$)

Dispersion ($P_4$): 30 parts of dispersion ($W_3$)+70 parts of dispersion ($S_4$)

Dispersion ($P_5$): 50 parts of dispersion ($W_4$)+50 parts of dispersion ($S_1$)

Dispersion ($P_6$): 55 parts of dispersion ($W_2$)+45 parts of dispersion ($S_5$)

Dispersion ($P_7$): 30 parts of dispersion ($W_3$)+70 parts of dispersion ($S_6$)

EXAMPLE 8

Dispersion ($P_8$)

100 parts of wax dispersion ($W_2$), 10 parts of silicone dispersion ($S_5$) and 4 parts of dispersant ($D_{K1}$) are mixed with each other at 50° C. with stirring.

Application Example A

A single jersey cotton tricot fabric (bleached, not optically brightened) is given at 40° C., at a liquor-to-goods ratio of 30:1 into an aqueous liquor that contains, referred to the substrate, 3% of dispersion ($P_1$) produced as described in Example 1. After 20 minutes at pH 5.0 and 40° C. and with continuous agitation of the substrate, this is removed from the liquor and dried for 70–90 seconds at 140° C. with tension (to original size).

Application Example B

A single jersey cotton tricot fabric (bleached, not optically brightened) is padded at room temperature to a pick-up of 100% with an aqueous liquor containing 30 g/l of dispersion ($P_1$) produced as described in Example 1. Then the padded material is dried during 70–90 seconds at 140° C.

Application Example C

A cotton cretonne fabric (bleached, caustic-soda-lye-treated, not optically brightened) is padded at room temperature to a 100% pick-up with an aqueous liquor containing 30 g/l of dispersion ($P_1$) produced as described in Example 1, 100 g/l of a 50% aqueous solution of dihydroxy-dimethylolethyleneurea and 50 g/l of magnesium chloride. The padded material is then dried during 100 seconds at 170° C.

Application Example D

Application Example B is repeated, with the difference that in place of dispersion ($P_1$) there is employed Dispersion ($P_1$) produced as described in Example 2.

Application Example E

Application Example D is repeated, with the difference that in place of cotton tricot single jersey there is employed cotton tricot interlock.

Application Example F

Application Example E is repeated, with a difference that instead of dispersion ($P_2$) there is employed dispersion ($P_3$) produced according to Example 3.

Application Example G

Application Example B is repeated, with the difference that instead of undyed cotton tricot single jersey there is employed a polyester woven fabric dyed with 0.4% of C.I. Disperse Blue 183 and instead of dispersion ($P_1$) there is employed dispersion ($P_4$) produced according to Example 4.

Application Example H

Application Example B is repeated, with the difference that instead of undyed cotton tricot jersey there is employed a woven cotton fabric which is dyed with 0.8% of C.I. Direct Blue 77 and instead of dispersion ($P_1$) there is employed dispersion ($P_4$) produced according to Example 5.

Application Example I

Application Example C is repeated, with the difference that instead of dispersion ($P_1$) there is employed dispersion ($P_5$) produced according to Example 6.

Application Example J

Application Example B is repeated, with the difference that instead of dispersion ($P_1$) there is employed dispersion ($P_7$) produced according to Example 7.

Application Example K

Application Example A is repeated, with the difference that instead of dispersion ($P_1$) there is employed dispersion ($P_8$) produced according to Example 8.

Application Example L

Application Example B is repeated, with the difference that instead of dispersion ($P_1$) there is employed dispersion ($P_6$) produced according to Example 6.

Application Example M

Application Example A is repeated, with the difference that instead of dispersion ($P_1$) there is employed dispersion ($P_6$) produced according to Example 6.

Application Example N 1 kg of cotton single jersey dyed blue is treated at 40° C. and at a liquor-to-goods ratio of 8:1 in a laboratory-jet (Labor-Jet from the firm MATHIS, Switzerland) with 30 g of dispersion ($P_8$). The liquor circulation rate is 60 l/min. The water is of a hardness of 10° dH (°dH=german degrees of water hardness). After the treatment the substrate is hydroextracted and then dried during 90 seconds at 140° C. without tension.

The goods finished according to the above Application Examples A to N display an outstanding, pleasant soft handle of optimum fullness and which is neither too "flowing" nor has the pronounced character of a "silicone soft handle". The dyed substrates are not impaired in their shade. The sewability is very good.

The soft handle is assessed mechanically in the "Handle-o-meter" (type 211-5 from the firm THORING Albert) and also manually with 10 different samples of a same finish for each finish. The sewability is assessed as described in DE 36 21 345 A1 for the sewability test and with the there described machine.

I claim:

1. An aqueous, dispersant-containing wax- and polysiloxane-dispersion (P) containing
   as wax
   (A) at least one cationically modified hydrocarbon wax and optionally
   (B) at least one non-oxidized hydrocarbon wax,
   as polydiorganosiloxane
   (C) at least one polydiorganosiloxane or amino-modified or non-ionically modified polydiorganosiloxane or amino-modified and non-ionically modified polydiorganosiloxane
   and as dispersant
   (D) a non-ionic, cationic or amphoteric dispersant.

2. An aqueous dispersion (P) according to claim 1 further comprising
   (E) at least one acid or at least one base or at least one acid and one base
   (F) at least one organic solvent or hydrotrope or at least one organic solvent and one hydrotrope (G) a preserving agent or a scent or a preserving agent and a scent or (E), (F) and (G).

3. A process for the production of an aqueous dispersion (P) according to claim 1 optionally further comprising one or more of
- (E) at least one acid or at least one base or at least one acid and at least one base
- (F) at least one organic solvent or hydrotrope or at least one organic solvent and one hydrotrope
- (G) a preserving agent or a scent or a preserving agent and a scent or (E), (F) and (G)

wherein an aqueous wax-dispersion (W) containing wax (A) and, if present, (B), is admixed with an aqueous dispersion (S) of the polydiorganosiloxane (C), in which at least a part of the dispersants (D) is contained in these dispersions and any further or other dispersant (D) or/and additional water and any further additives (E), (F) and/or (G) may be added simultaneously or afterwards.

4. A process according to claim 3, wherein an aqueous dispersion (W') of (A) and optionally (B) which contains as dispersant
- (D') at least one cationic surfactant ($D_K$) optionally in admixture with at least one non-ionogenic surfactant ($D_O$)

is admixed with an aqueous dispersion (S') of (C), which contains as dispersant
- (D") at least one non-ionic surfactant ($D_O$) and optionally at leat one amphoteric surfactant ($D_x$) or at least one cationic surfacant ($D_K$), or both and optionally with further surfactant (D) and/or water.

5. A process for the finishing of fibrous material in which an effective finishing amount of the dispersion (P) according to claim 1 is placed in contact with the fibrous material.

6. A process according to claim 5 in which the finishing is carried out simultaneously with a synthetic resin finishing.

7. A finishing agent for fibrous material which is an aqueous dispersion (P) as defined in claim 1.

8. A finishing agent for fibrous material which is an aqueous dispersion (P) as defined in claim 2.

9. The process according to claim 5, in which the fibrous material is cellulosic colored textile goods.

10. A composition according to claim 1, consisting essentially of (A), (C), (D) and optionally (B) or one of the following components
- (E) at least one acid or at least one base or both,
- (F) at least one organic solvent or hydrotrope, or both, or
- (G) a preserving agent or scent, or both, or both (B) and at least one of (E), (F) or (G).

* * * * *